Oct. 10, 1961 P. J. KILDAY 3,003,393
FILMSTRIP ADVANCE AND ALIGNING MECHANISM
Filed May 31, 1960
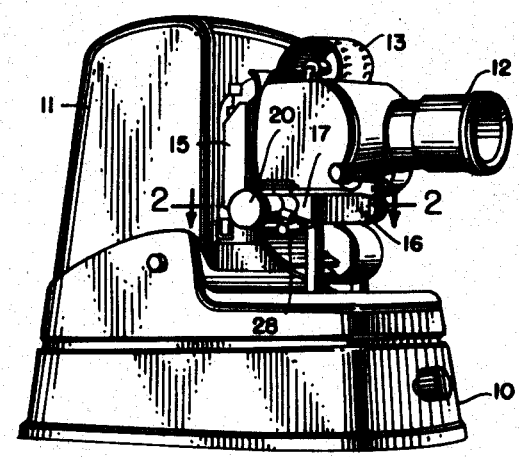
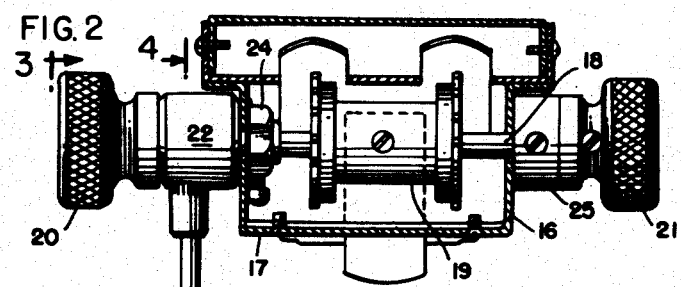
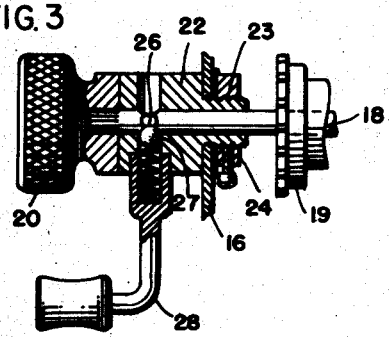
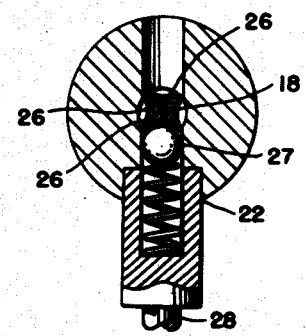
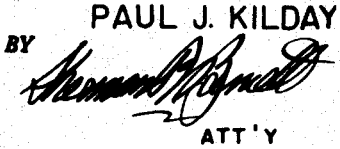
INVENTOR:
PAUL J. KILDAY
BY
ATT'Y

United States Patent Office 3,003,393
Patented Oct. 10, 1961

3,003,393
FILMSTRIP ADVANCE AND ALIGNING
MECHANISM
Paul J. Kilday, Niles, Ill., assignor to Standard Projector
and Equipment Company, Inc., Niles, Ill., a corporation of Illinois
Filed May 31, 1960, Ser. No. 32,631
1 Claim. (Cl. 88—28)

This invention relates to a film projector and, more specifically, to an improvement in the film advancing and aligning mechanism such as is commonly found on film projectors adapted to project the successive frames of the filmstrip.

As is well understood in the film projector field, means must be provided not only for the step-by-step advancement of the filmstrip for the proper projection of each individual frame or picture but, in addition, means must also be provided for an adjustment whereby the frame is properly aligned with lenses of the projector to give a full and independent projection of each frame without overlapping with the next or a previous frame. Customarily the actual aligning adjustment is necessary only with the initially projected frame for the reason that the conventional film advancing mechanism is designed to advance the film precisely the necessary distance from frame to frame.

There have been many film advancing and aligning mechanisms developed, but all of them are generally unsatisfactory, either from the standpoint of reliability, ease of operation or cost of manufacture. For example, one type of film advancing and aligning mechanism involves a bow leaf spring which bears against a block with four concave sides held on the drive shaft by a set screw. Not only is a leaf spring unreliable over a period of time but a block is likewise subject to slippage and, as will be seen, it a part which is wholly unnecessary. Likewise various pawl and ratchet mechanisms have been developed for the desired step-by-step movement of the film advancing mechanism plus binding springs or other clutch mechanisms for adjusting the position of the ratchet teeth for aligning purposes. See, for example, U.S. 1,738,762 to De Vault, U.S. 2,067,-835 to Erwood, and U.S. 2,299,973 to Getten. Further, it has heretofore been relatively common to employ, as a spacing and aligning mechanism, a spring-pressed detent which bears against the face of the wheel or knob which is formed with spaced recesses for receiving the detent as the drive shaft is rotated. See U.S. 2,033,038 to Lee; U.S. 2,534,731 to Perillo and U.S. 2,793,563 to Koskela.

The present invention is an improvement on the spring-pressed detent type of film advancing and aligning mechanism and involves not only the entire elimination of one of the parts of the prior art devices but also gives a more dependable performance over a long period of time without any possibility of slippage or breakage.

The principal object of this invention is to provide an improved filmstrip advancing and aligning mechanism which is less expensive and more dependable than prior mechanisms of this type and free from the objectionable features inherent in said prior mechanisms.

Another object of this invention is to provide for film projectors an improved film advancing and aligning mechanism which has fewer parts than other mechanisms of the same general type and which will operate efficiently with out wear or breakage over a long period of time.

These and other objects will more fully appear from the following description and with reference to the accompanying drawings wherein:

FIG. 1 is a perspective view of a film projector embodying the present invention.
FIG. 2 is a perspective view of the film advancing and aligning mechanism, shown partially in section.
FIG. 3 is a sectional view taken along line 3—3 of FIG. 2.
FIG. 4 is a cross sectional view taken along line 4—4 of FIG. 2.

Referring now to FIG. 1 of the drawings, the film projector, which is of standard construction, consists of a base portion 10 to which is pivotally secured a housing 11 and a focusing lens 12. The housing 11 encloses a source of light which is projected, in familiar manner, through an aperture (not shown) positioned between the housing 11 and the focusing lens 12. A film 13 is adapted to be moved, frame by frame, past the aperture whereby the picture is projected through the lens 12 and onto a screen or other reflecting surface.

Mounted between the housing 11 and the lens 12 is a filmstrip feeding device, generally indicated by reference character 15, which has a depending bracket 16 formed with aligned openings, on which is mounted the film advancing and aligning mechanism, indicated generally by reference character 17, which embodies the present invention.

Referring now to FIG. 2, the film advancing and aligning mechanism 17 consists basically of a shaft 18, a film receiving sprocket wheel 19, film advancing knobs 20 and 21 and a framing or aligning sleeve 22. The longitudinal axes of sleeve 22 and the sprocket wheel 19 are bored to receive the shaft 18. The sleeve 22 is formed at one end with an exteriorly threaded hub portion 23 which is adapted to extend through one of the openings on the bracket 16. At the other end the diameter of the sleeve is greater than the opening in the bracket 16.

As shown, the sleeve 22 is mounted on bracket 16 by means of a nut 24 (preferably with a lock washer) which fits over the threaded hub 23 of the aligning sleeve 22. The shaft 18 extends through the longitudinal bore of sleeve 22 and sprocket wheel 19. The film advancing knobs 20 and 21 are secured by set screws at opposite ends of the shaft. As will be seen, the two knobs serve the same function and, if desired, one of them could be eliminated. Knob 21 is spaced from the bracket 16 by means of a spacer 25.

The aligning sleeve 22 is not securely fixed to the shaft 18, as is the case with the film advancing knobs 20—21, the sprocket wheel 19 and the spacer 25, but is adapted for rotation optionally either with or on the shaft 18 in the manner now to be described.

Referring particularly to FIG. 4, the shaft 18 is formed at its periphery at a point opposite the central section of aligning sleeve 22 with four equi-distant indentations 26. The indentations 26 are adapted to receive a spring-pressed detent 27 mounted within the framing sleeve 22. The sleeve 22 is preferably provided with a crank handle 28, although any suitable gripping area may be employed.

The nut 24 is tightened sufficiently against the bracket 16 to hold the sleeve 22 stationary when the shaft 18 is rotated by turning either one of the film advancing knobs 20 or 21, but is sufficiently loose against bracket 16 so that both the sleeve 22 and the shaft 18 will rotate as a unit when the crank arm 28 is turned.

It will thus be seen that as the film advancing knob 20 is turned the shaft 18 and sprocket 19 will likewise turn but the shaft 22 will remain stationary. It will also be seen that during such turning of the knob 20 the spring-pressed detent 27 will move out of engagement with one indentation 26 and, when the shaft 18 is rotated 90 degrees, will engage the next indentation in the shaft.

As will be well understood, the sprocket 19 is of such size that each 90° turn of the shaft 18 will advance the film one complete frame. This, of course, could be modified so that, for example, a 180° turn of the shaft will advance the film one complete frame thus requiring only two indentations or recesses 26 on the shaft 18. Indeed, circumstances may arise in which only one indentation may be required. However, in the preferred embodiment of the invention four indentations 26 are used, as illustrated.

If, when the first frame of the film is projected, the frame is out of alignment with the lens aperture (not shown) which is positioned between the focusing lens 12 and the customary lens in the housing 11, the film can be quickly aligned with said aperture simply by moving the crank arm 28 which, by virtue of the spring-pressed detent 27, engages and turns the shaft 18, whereby the sprocket 19 is rotated until the desired alignment has been achieved. After such preliminary adjustment, accomplished through the crank arm 28, the film will automatically be aligned as the film advancing knob (or, optionally, the other film advancing knob 21) is turned through 90 degrees or whatever ratio may be employed.

It will thus be seen that by virtue of the present invention accurate and fast film alignment may be obtained without the necessity of having special cams on the sprocket driving shaft or pawl and ratchet mechanism, or other flat spring actuated devices which are subject to failure and breakage and which can also go out of adjustment. The positioning of the indentation 26 engaged by the spring-pressed detent 27 directly on the shaft 18 not only saves the manufacturing costs necessarily involved with the extra parts required by the prior art mechanisms but also gives an aligning operation which cannot get out of adjustment, which is less liable to wear and breakage and which generally gives more satisfactory results.

It is the intention to cover the above embodiment of the invention and all modifications thereof falling within the scope of the following claim.

What is claimed as new and desired to be secured by Letters Patent of the United States is:

In a projector for filmstrips, a film advancing and aligning mechanism comprising a supporting bracket secured to the projector and having a pair of spaced and downwardly projecting legs, each leg having an opening aligned with the corresponding opening in the other leg, a film aligning sleeve formed with a longitudinal bore and having an enlarged head at one end of greater diameter than the bracket openings and at the other end a threaded hub portion adapted to project through one of said bracket openings, a nut tightened on said threaded portion to hold said aligning sleeve snugly rotatable in said opening, a spring-pressed detent mounted in said sleeve whereby the detent is urged toward and partially into the longitudinal bore of said sleeve, a shaft extending through said sleeve bore and both of the aligned bracket openings and rotatable within said sleeve bore, said shaft being formed with equally spaced peripheral indentations, each indentation adapted to be engaged by said spring-pressed detent, a film engaging sprocket wheel rigidly mounted on said shaft between the two bracket openings, a film advancing knob secured to one end of said shaft for rotating said shaft and sprocket wheel independently of said sleeve, and a handle projecting outwardly from said sleeve for rotating said sleeve, shaft and sprocket as a unit for aligning the film in the projector.

References Cited in the file of this patent

UNITED STATES PATENTS

| | | |
|---|---|---|
| 2,534,731 | Perillo | Dec. 19, 1950 |
| 2,659,267 | Baule | Nov. 17, 1953 |
| 2,793,563 | Koskela | May 28, 1957 |